Patented Jan. 4, 1949

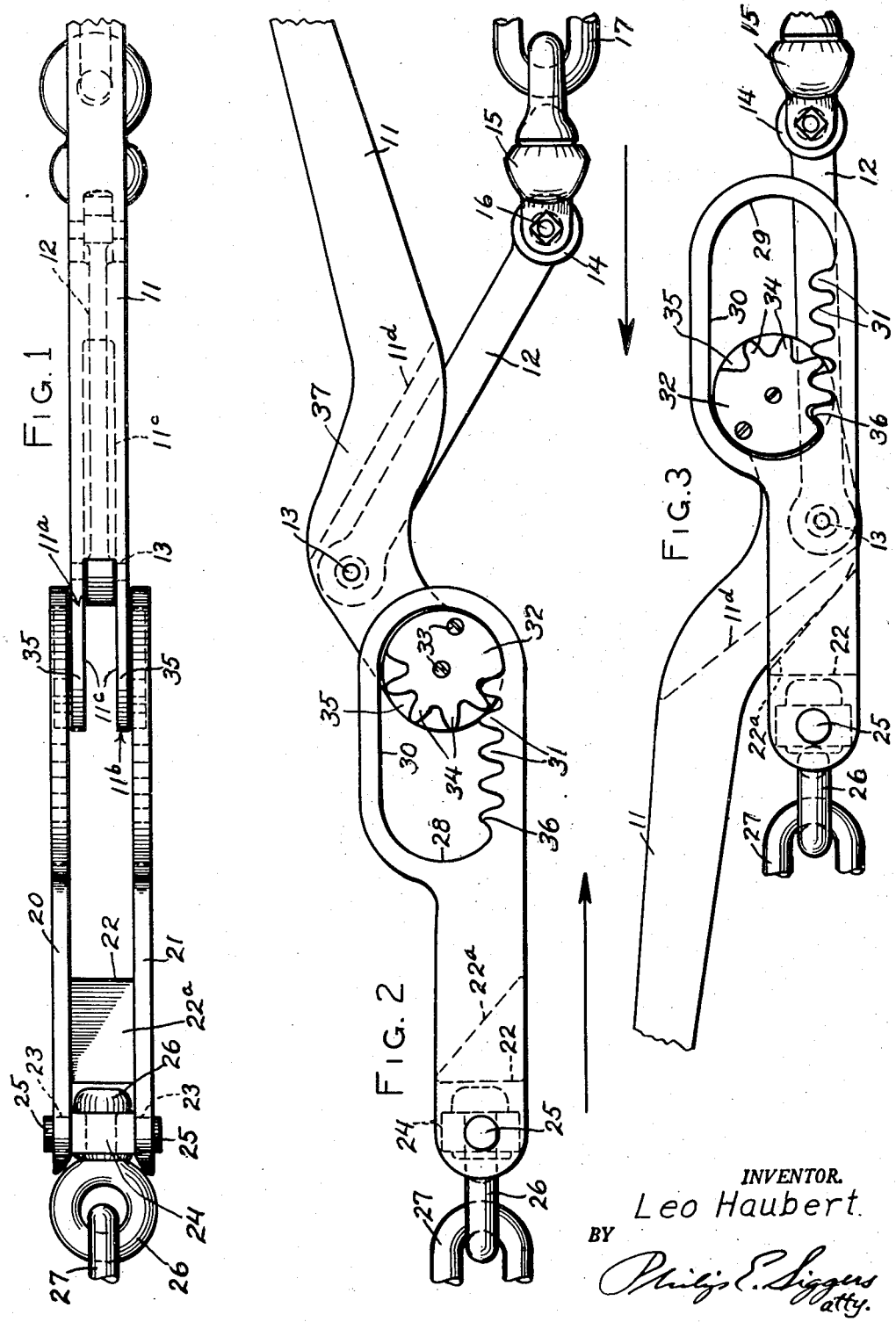

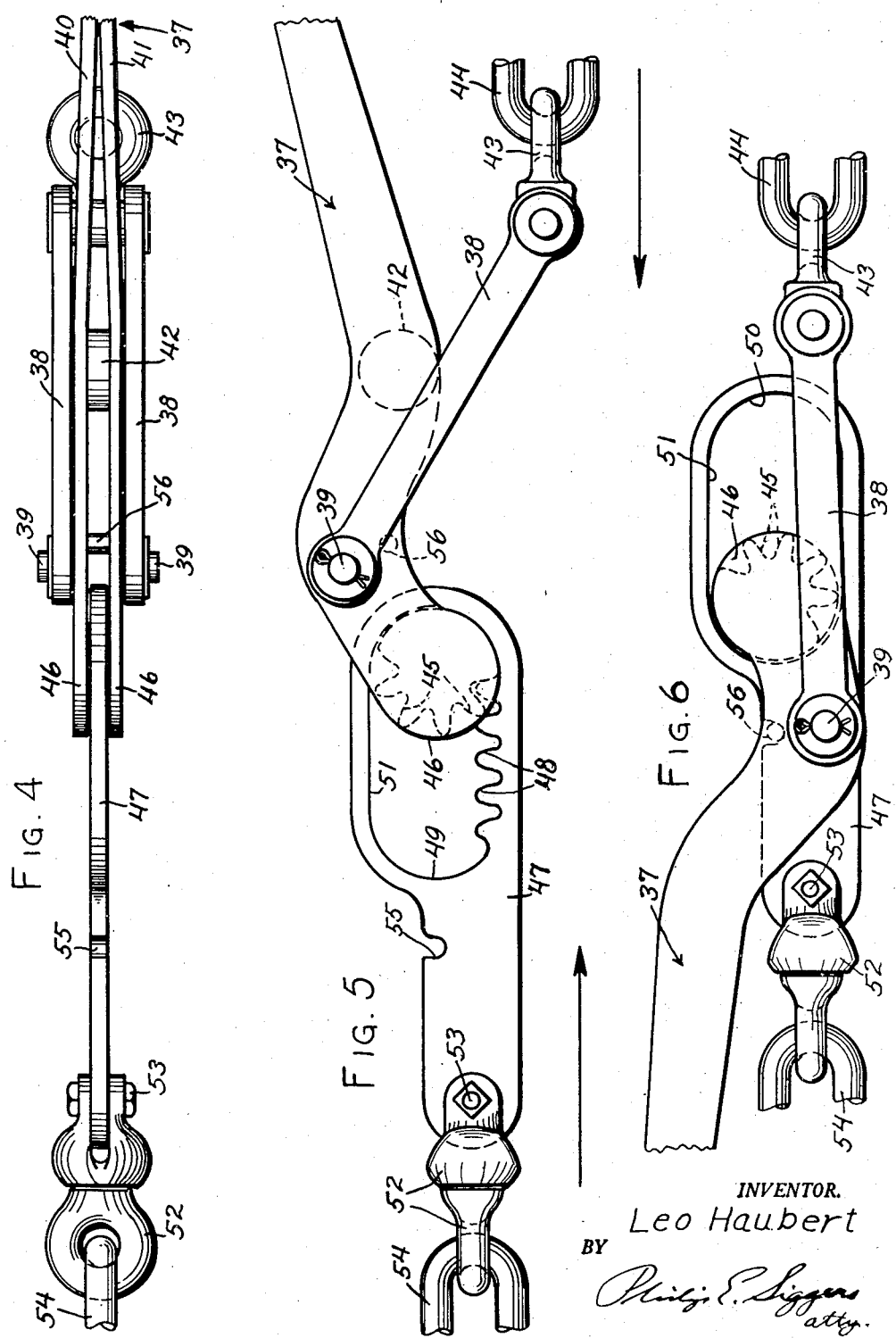

2,458,375

UNITED STATES PATENT OFFICE 2,458,375

GEAR RACK LOAD BINDER

Leo Haubert, Tulsa, Okla.

Application September 27, 1946, Serial No. 699,873

20 Claims. (Cl. 24—68)

This invention relates to load binders. Its principal objects are to provide a load binder having a smooth and even action, an extraordinary take-up, and a high mechanical advantage, as compared with prior art load binders.

Another object is to provide a load binder which is easily manufactured, assembled and disassembled.

A further object is to provide a load binder which is rugged and will function perfectly under the abuse such tools are commonly subjected to.

A still further object is to provide a load binder which may be offered to the trade as both a heavy duty and a light duty model.

Others objects will be in part obvious from the following description and in part will be pointed out as the description proceeds. Accompanying and forming a part of this specification are drawings in which two embodiments of the invention are shown.

In said drawings,

Fig. 1 is a plan view of one form of load binder embodying the invention, which I call the "heavy duty" model.

Fig. 2 is a side elevation of the same, shown as the lever starts to swing toward load-tightening position.

Fig. 3 is a similar view but showing the lever swung all the way over until the parts are locked in load-binding position.

Fig. 4 is a plan view of a modification, which I call the "light duty" model.

Fig. 5 is a side elevation of the light duty model shown as the lever starts to swing toward load-tightening position.

Fig. 6 is a similar view, showing the light duty model in locked position.

Referring particularly to the drawings, and first to Figs. 1, 2, and 3, the heavy duty load binder of my invention consists of three principal parts, viz. a lever, a link pivoted to the lever, and a member with which the lever interlocks and on which its fulcrum end rolls to tighten or loosen the load-binding elements.

The lever 11 is preferably straight and of solid metal for about two-thirds of its length but at its inner or fulcrum end is bifurcated as indicated at 11a, 11b to provide a slot 11c in which link 12 may swing, the link 12 being pivoted at one end to the lever by a cross pin 13 which passes through parts 11a, 11b and is riveted in position. A wall 11d on the inside of the bifurcated lever provides a stop to prevent further swinging of the link in one direction. Link 12 has an attaching eye 14 integral therewith, and a swivel eye 15 may be secured by a bolt 16 to said attaching eye, while a load-binding or other chain 17 may be connected with swivel eye. The swivel eye is merely illustrative of a number of connecting devices which may be secured on or hooked in the attaching eye 14 to make it possible to exert a pull on a chain or the like.

Co-operating with the lever is a rack and cage member which consists of two parallel straight flat shanks 20, 21 connected by a lever-stop 22 which may be screwed or bolted to the two shanks and lies between them. At one end, the shanks 20, 21 have aligned bores 23 and a swivel base 24 has trunnions 25 which turn in bores 23. A swivel eye 26 is rotatable on the swivel base and provides means by which a chain 27 or chain-connecting means may be attached to that end of the rack and cage member. It will be noted that the lever-stop 22 is a triangular block or tetrahedron and is located as close as possible to the inner end of the swivel eye, though without interference with free swinging of the swivel eye with its base 24. The inclined face or wall 22a of the lever-stop is adapted to be contacted by the lever 11 in one extreme position.

At the opposite end of the rack and cage member, each of the shanks is formed like a closed loop with arcuately curved end walls 28, 29, a straight wall 30, and a rack 31 formed of a number of teeth (preferably at least five) integral with the shank. Wall 30 is parallel to the rack 31. As the shanks are parallel, racks 31 are parallel and all parts of both loops correspond. Indeed, the two shanks are identical parts secured together in parallelism.

To make it possible for the lever to rock and interlock with the rack and cage member, the two furcations of the lever have circular members 32 secured on the outer faces thereof by screws 33. The radius of each circular member 32 is the same as the radius of the arcuate end walls 28, 29 so that parts of the peripheries of the circular members 32 may fit closely against end walls 28, 29 in opposite limits of movement of the lever. The drawings exaggerate the clearances between these closely fitting parts, also the clearances between the rack teeth and the pinion teeth. Each circular member 32 is also a segment of a pinion, having teeth 34 meshing with rack 31. The fulcrum ends of the lever are preferably arcuate, as indicated at 35, are of a radius at least equal to the radius of the circular members 32, and the outer faces of arcuate ends 35 may slide along the inside faces of the teeth of the racks 31 as the lever is swung back and forth, if such a close fit is desired. The thickness of each circular member is about equal to the thickness of the rack and cage member in which it rolls.

Assuming that a load is to be tightened, the load binder is secured to the chain or other connecting means at both of its ends, with the parts about in the position of Fig. 2. Then the lever is swung counter-clockwise, which turns the two circular members 32 to bring pinion teeth 34 successively in contact with the teeth of the rack. The teeth can not separate because the loop acts as a cage, the arcuate portions of the circular members 32 contacting the straight wall 30 and rolling along the same. When the lever has reached its extreme limit (Fig. 3) one of the rack teeth 36 (which is broader at its base than the other teeth of rack 31) will take most of the stress or load. The part transmitting the stress or load is a solid or untoothed portion of circular member 32.

Because of a bend 37 in lever 11, and the slot in its fulcrum end, it is possible to swing the lever through a greater arc. One side of the bent portion 37 directly contacts the stop wall 22a when the lever has reached its limit of movement. At this time, link 12 has passed between the shanks and is past the dead center position. Thus the load binder is self-locking and any increase in the stress merely tends to pull the lever tighter. The direct contact of the lever against the stop-block 22 transfers part of the load to said stop-block. The take-up of the described load binder is exceptional, being 5¾ in. by actual measurement with a working model similar to the drawings. Moreover, as the centers of the pivot connection of link 12 and the pinion 32 are close together, the leverage is greater than with other load binders.

Now referring to Figs. 4, 5 and 6, which show a generally similar load binder designed for lighter duty, a lever 37 has a clevis 38 pivoted thereto by trunnions 39, the lever being bifurcated or consisting of two like parts or halves 40, 41 secured at their outer ends by a screw or the like, not shown, and secured at an intermediate point by a spacer 42 and a screw, not shown. The clevis (which preferably is split or of two like parts) carries at its free end a swivel eye 43 or other means for connecting a chain 44 or the like to the load binder. The clevis embraces and swings freely on the lever until the swivel eye contacts the shank of the lever. Pinion teeth 45 are formed on the fulcrum end of the lever preferably by securing between the lever halves a circular member (exactly like circular members 32) having an arcuate untoothed portion for about half its periphery and teeth 45 for the other half. Screws (not shown, because they enter from the opposite side) may connect the lever halves with the circular member. The fulcrum ends of the lever are rounded as indicated at 46 and embraces a rack and cage member 47 which will now be described.

The single rack and cage member 47 on which the lever is rocked consists of a straight flat body or shank with a closed loop or cage at one end, the loop or cage being preferably exactly like the corresponding part in the previously described embodiment, Figs. 1—3. The loop or cage includes rack teeth 48, arcuately curved end walls 49, 50, and a straight wall 51 parallel to the rack 48. At the other end of the shank a swivel eye 52 may be connected by a bolt 53 to provide means by which a chain 54 or the like may be connected to that end of the load binder. In this embodiment of the invention, the lever stop is in the form of a notch 55 cut in one edge of the shank of member 47 and adapted to receive a pin 56 which is rigidly secured as by a press fit to the two halves of the lever, spanning the space between the two halves as shown in Fig. 4. When the lever is in tightened position, Fig. 6, the stop pin acts as a locking pin to prevent the lever from becoming unlocked if the load chain should become slack. Also part of the load is transferred to the shank. With this form of the invention, the take-up is 7¼ in., much greater than the old type of load binder which has a take-up scarcely exceeding 4½ in.

Both forms of the invention are characterized by a remarkably smooth and even action, the pinion teeth and circular portions cooperating to roll back and forth in the cages. Both forms are self-locking and both, in addition to an extraordinary take-up afford a high mechanical advantage.

Obviously the present invention is not limited to the two forms particularly described and shown herein. Moreover it is not indispensable that all features of the invention be used conjointly, since they may be employed in various combinations and subcombinations.

Having described two embodiments of my invention, what I claim as new and desire to secure by Letters Patent is:

1. A load binder comprising, in combination, a lever, a link or clevis pivotally connected to the lever near its fulcrum, a partially formed gear fixed to the lever at its fulcrum, a rack member with which the teeth of the gear mesh to provide a shifting fulcrum for the lever, said rack member having means limiting travel of the gear and hence swinging of the lever, and separate means facilitating attachment of the free end of the link or clevis and the end of the rack to a load-binding element.

2. A load binder comprising, in combination, a lever, a link or clevis pivotally connected to the lever near its fulcrum, gear teeth formed on the extreme end of the lever, a member having means at one end for connection with a chain or other load-binding element and having a rack at the other end, the gear teeth meshing with the teeth of the rack and providing a shifting fulcrum for the lever, and means integral with said member providing stops for the lever at both ends of the rack and also interlocking with a part of the lever to prevent separation of the lever and rack.

3. A load binder comprising, in combination, a lever, a link or clevis pivotally connected to the lever near its fulcrum, gear teeth formed on the extreme end of the lever, a member having means at one end for connection with a chain or other load-binding element and having a rack at the other end, the gear teeth meshing with the teeth of the rack, and loop or cage means on said member for holding the teeth in mesh at all times, the lever having surfaces interlocking with the loop or cage means but permitting free swinging of the lever between the ends of the loop or cage means.

4. A load binder comprising, in combination, a rack, means attached to one end of the rack to facilitate connection thereof to a load-binding element, a lever, a fragment of a pinion secured to the fulcrum end of the lever and having its teeth meshing with the rack, means on the rack and lever to prevent separation thereof, and a link or clevis pivotally connected at one end with the lever and having means at its other end facilitating connection with a load-binding element; the point of pivotal connection of the link or clevis to the lever being so disposed relative to the pinion teeth that when the lever is swung in the proper direction to tighten the load-binding element, said point of pivotal connection will pass beyond the line of dead center and the parts will lock and cannot become unlocked except by swinging the lever in the reverse direction.

5. The invention according to claim 4, wherein the rack has stop means for direct engagement by part of the lever when swung to the extreme load-tightened position, said stop means taking part of the load off the meshing teeth.

6. The invention according to claim 4, wherein the pinion has teeth for approximately half of its periphery and has the remainder of its periphery smooth and arcuate, the radius of the arcuate portion being substantially the radius of the points of the teeth.

7. The invention according to claim 4, wherein the means to prevent separation of the rack and lever consists of a loop-like member integral with the rack and having rounded ends and a straight wall between the rounded ends and parallel to the teeth of the rack, the pinion fragment having an arcuate wall which fits against either rounded end when the lever is swung as far as it will go in either direction.

8. The invention according to claim 4, wherein the lever has an arcuate surface which completes the periphery of the pinion fragment and the rack has a loop-like or cage member with arcuate ends of the same curvature as said arcuate surface on the lever, so that when the lever is swung in either direction, it is stopped by direct contact of the complementary arcuate surfaces.

9. A load binder consisting of a lever having gear teeth formed on the fulcrum end thereof; a link or clevis pivotally connected at one end to the lever intermediate its ends; said lever being swingable in one direction to such an extent that the longitudinal axis of the lever nearly coincides with the longitudinal axis of the link or clevis; and a rack member having rack teeth with which said gear teeth mesh, and also having a guard holding the gear teeth constantly in mesh, the lever and guard having interlocking surfaces to prevent separation thereof.

10. A load binder comprising, in combination, a lever having a generally circular fulcrum end with gear teeth formed thereon for about half of the periphery of the circular end; a link or clevis pivoted at one end to the lever at a point spaced from the fulcrum end but much nearer the fulcrum end than the outer end of the lever; means for connecting the free end of the link or clevis to a chain or the like; a generally straight member having a loop-like cage formation at one end and having means at the opposite end for connecting a chain or like load-binding element; said loop-like or cage formation consisting of a rack, a straight side paralleling the rack, and two arcuate end portions; the gear teeth on the lever meshing with the rack and the remainder of the generally circular fulcrum end abutting either arcuate end portion when the lever is swung in either direction to the extreme limit permitted by the construction.

11. The invention as set forth in claim 10, wherein the generally straight member has stop means thereon spaced from the loop-like formation and adapted to be directly contacted by the lever when the lever has been swung past deadcenter position.

12. A local binder comprising, in combination, a bifurcated member having means at one end for connecting a chain or other load-binding element; said furcations being parallel and each having a loop-like portion with rack teeth comprehended within the confines of the loop-like portion; a lever having a generally circular fulcrum end which is also bifurcated, with one furcation enclosed by each loop-like portion and having gear teeth formed thereon and meshing with the rack teeth; and a link pivoted at one end to the lever intermediate its ends.

13. The invention according to claim 12, wherein the link is pivoted between the furcations of the lever, and means are secured to the free end of the link to connect a chain or other load-binding element.

14. The invention according to claim 12, wherein the bifurcated member has stop means located near the connecting means and adapted to be directly contacted by the lever when swung to extreme load-tightening position, the parts being so constructed and arranged that the lever when in that position is beyond dead-center and is locked.

15. A load binder consisting of a lever which is bifurcated at and near its fulcrum end, a link pivoted at one end to the lever to swing between the furcations thereof; the lever forming a stop for the link; means on the free end of the link for connecting a chain or other load-binding element; a bifurcated member having means on one end for connecting a chain or other load-binding element; lever stop means between the parts of the bifurcated member; the bifurcated member having two parallel loop-like members, each loop-like member having a rack; the furcations of the lever each having means contacting a loop-like member on the inside face thereof and each having a circular portion wholly enclosed by the loop-like member, each circular portion having gear teeth formed thereon for about half the periphery of the circular portion and meshing with the rack, the circular portions each interlocking with the loop-like member to prevent separation of the lever from the bifurcated member.

16. A load binder having a lever bifurcated at one end and having a link pivoted at one end between the furcations; a pair of identical members secured together in parallelism with lever stop means forming a part of the securing means; said identical members having rack teeth formed thereon and cage means associated with the rack teeth; the furcations of the lever having pinion teeth thereon together with means which roll back and forth in the cage means as the lever is swung in opposite directions; and means on the free end of the link and also on the pair of identical members to facilitate attachment of a chain or the like.

17. A load binder comprising, in combination, a straight shank having means at one end for connecting a chain or other load-binding element; a closed loop formation including rack teeth located at the other end of the straight shank; a lever having a fulcrum end with gear teeth formed thereon; the gear teeth meshing with the rack; the fulcrum end of the lever and parts adjacent being bifurcated and straddling the loop formation; a clevis pivoted at one end to the lever at an intermediate point and straddling the lever at its bifurcated portion; and means on the free end of the clevis for connecting a chain or other load-binding element.

18. The invention according to claim 17, wherein the straight shank has a notch on one edge and the bifurcated portion of the lever has a pin which is received in said notch when said lever is swung past dead-center position, said pin acting as both a lever-stop and a lock for the lever.

19. The invention according to claim 17, wherein the loop formation includes a straight portion parallel to the rack and two arcuate end portions at the opposite ends of the rack and the portion parallel thereto, the fulcrum end of the lever being enclosed by the loop formation and having an arcuate portion which bears against the straight portion of the loop when the gear teeth mesh with the rack.

20. The invention according to claim 17, wherein the bifurcated portion of the lever straddles the straight shank, while the clevis straddles both the straight shank and the loop formation and is aligned with the longitudinal axis of said straight shank, when the lever is swung to extreme load-tightening position.

LEO HAUBERT.

No references cited.